INVENTOR,
WILLIAM FRANK HILL
BY Hofman, Glascock, Downing & Seebold
ATTORNEYS

United States Patent Office 3,564,362
Patented Feb. 16, 1971

3,564,362
ELECTRIC DRIVE UNIT UTILIZING AN M-G SET AS ANOTHER DRIVE UNIT WHEN A CERTAIN SPEED IS ATTAINED
William Frank Hill, Stafford, England, assignor to Joseph Lucas (Industries) Limited, Birmingham, England, a British company
Filed Aug. 6, 1968, Ser. No. 750,534
Claims priority, application Great Britain, Aug. 29, 1967, 39,426/67
Int. Cl. H02p 7/68
U.S. Cl. 318—45        4 Claims

ABSTRACT OF THE DISCLOSURE

An electric drive unit comprising a motor connectible to a source of D.C. supply, the motor driving a generator which in turn supplies electric current to a motor from which the output of the system is obtained, means being provided to control the excitation of the generator and clutch means being provided to effect connection between the shafts of the motors and the generator and switch means being provided to connect the generator and motors across the source of D.C. supply.

---

This invention relates to electric drive units for operation from a source of D.C. supply and has for its objects to provide such a unit in a simple and convenient form.

An electric drive unit in accordance with the invention comprises in combination, a first motor connectible across the terminals of a source of D.C. supply, a generator driven by said first motor through a first shaft, a second motor electrically connected to said generator said second motor having an output shaft from which the output of the traction system is obtained (means for adjusting the excitation of said generator, whereby the speed of said output shaft can be varied), a clutch whereby said shafts can be connected together when the speed of said shafts are substantially equal and switch means through which the generator and the second motor can be connected to the source of supply when said clutch has been engaged, whereby the generator acts as a motor to drive the output shaft in conjunction with the two motors.

Examples of electric drive units in accordance with the invention will now be described with reference to the accompanying circuit diagrams referenced FIGS. 1 and 2. The particular circuit diagrams are for traction systems for a road vehicle which is operable from a storage accumulator, carried on the vehicle.

Figure 1:
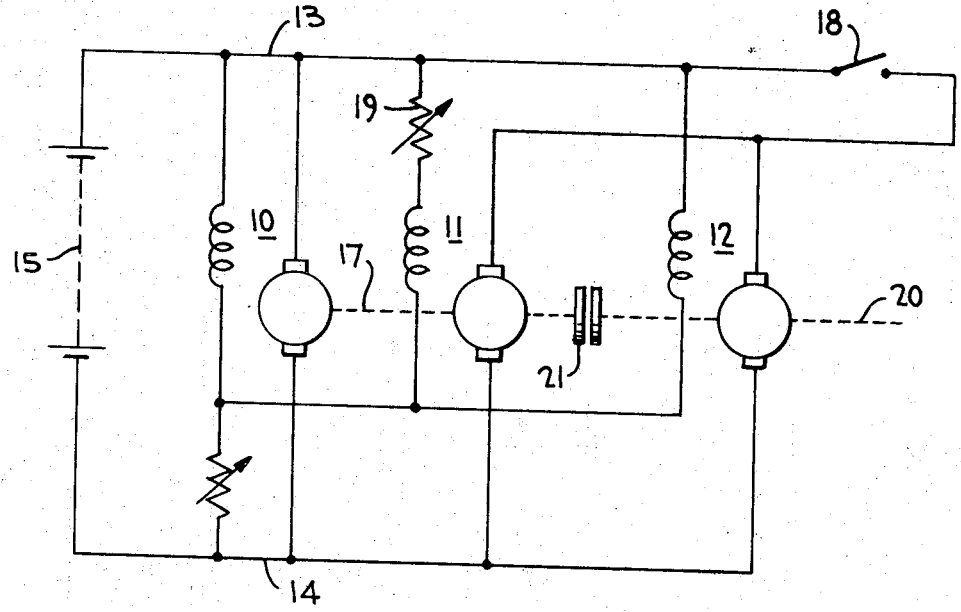
Figure 2:
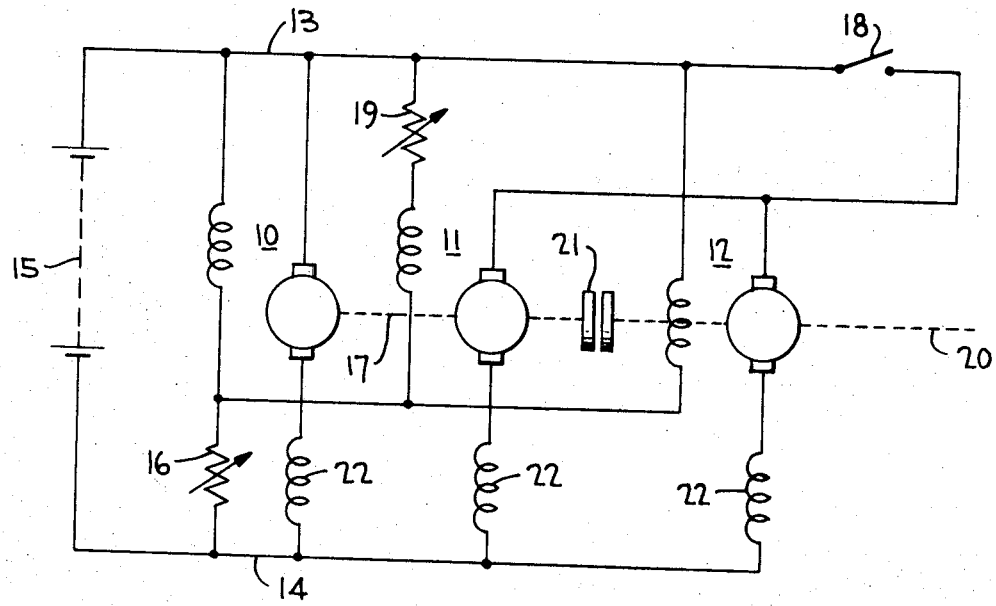

With reference to FIG. 1, three dynamo electric machines referenced 10, 11 and 12 of the shunt field homopolar type are provided. The machine referenced 10 is operated as a motor and its armature is directly connected across a pair of supply lines 13 and 14 which are connected to the terminals of the storage accumulator 15. One end of the field winding of this machine is connected to the supply line 13 and the other end of the field winding is connected to the supply line 14 by way of a resistance type controller 16.

The machine 11 initially constitutes a generator and it is driven by the machine 10 by way of a coupling shaft 17. One brush of the armature of the machine 11 is directly connected to the supply line 14 and the other brush is permanently connected to one brush of the armature of the machine 12. In addition these brushes may be connected to the supply line 13 through a switch 18. The other brush of the armature of the machine 12 is connected to the supply line 14. One end of the field winding of the machine 11 is connected to a point intermediate the field winding of the machine 10 and the controller 16 whilst the other end of the winding is connected to the supply line 13 through a further resistance type controller 19. One end of the field winding of the machine 12 is connected directly to the supply line 13 and the other end of this winding is connected to a point intermediate the field winding of the machine 10 and the controller 16.

The machine 12 is provided with an output shaft 20 which is coupled to the driving wheels of the vehicle and the shafts 17 and 20 may be connected together through a clutch 21.

The operation of the unit will now be described assuming that the vehicle is at rest. In the rest condition the clutch 21 is disengaged and the switch 18 is opened. Furthermore, the controller 16 is set to a position at which it offers no resistance to the flow of electric current. The controller 19 is set to a position in which it offers the maximum resistance to the flow of current. When the supply lines 13 and 14 are connected to the storage accumulator 15 the machine 10 acts as a motor to drive the machine 11 which acts as a generator. The output of the latter is delivered to the machine 12 which is also fully excited. The output of the generator is controlled by the controller 19 and by reducing the resistance offered to the flow of electric current so the output of the generator is increased and the speed of rotation of the shaft 20 also increases. When the controller 19 is at a position in which the minimum or no resistance is offered to the flow of electric current and the machine 12 has achieved its maximum speed, the clutch 21 is engaged and the switch 18 is closed. At this point all three machines are connected to the road wheels of the vehicle and all three machines are acting as fully excited shunt motors. At the point of engagement of the clutch there will be no substantial increase in speed of the vehicles since providing the machines are substantially identical the speed of rotation of the output shaft 20 will only be slightly lower than that of the shaft 17.

Further increase in speed of the vehicle is obtained by adjusting the controller 16 to reduce the current flowing in the field windings of the three machines.

Low speed reversal of the direction of rotation of the shaft 20 may be achieved by reversing the connections to one of the field windings and if high speed operation of the system is required in reverse then it will be necessary to reverse the connections to all the field windings.

It will be appreciated that dynamoelectric machines having wound armatures can be used instead of homopolar machines. In this case and as is shown in FIG. 2, the machines can be provided with series windings 22 in order to improve the load sharing when the machines are acting as motors. Such an arrangement is not practical when homopolar machines are used because of the very high armature current involved.

In a modified construction the controllers 16 and 19 would be electronic controllers operating in "class D," i.e., the variable ratio high frequency switching mode and employing feedback. Switch 18 which would be an electromagnetic contactor would be responsive to the degree of saturation of the feedback loop of controller 16.

Having thus described my invention what I claim as new and desire to secure by Letters Patent is:

1. An electric drive unit for operation from a source of D.C. supply and comprising in combination a first motor connectible across the terminals of a source of D.C. supply, a generator driven by said first motor through a first shaft, a second motor electrically connected to said generator said second motor having an output shaft from which the output of the traction system is obtained, means for adjusting the excitation of said generator, whereby the speed of said output shaft can be varied, a clutch whereby said shafts can be connected together when the speeds of said shafts are substantially equal and switch means through which the generator and the second motor can be connected to the source of supply when said clutch has been engaged whereby the generator acts as a motor to drive the output shaft in conjunction with the two motors.

2. An electric drive unit as claimed in claim 1 including further means operable to control the excitation of the generator and motors at the same time.

3. An electric drive unit as claimed in claim 2 in which said motors and said generator are shunt excited homopolar machines.

4. An electric drive unit as claimed in claim 2 in which said motors and said generator are shunt excited machines having wound armatures, series field windings being provided to ensure load sharing between the machines when said clutch is engaged and when said switch means is closed.

References Cited

UNITED STATES PATENTS 2,351,316    6/1944    Borden _____ 318—154

FOREIGN PATENTS 103,065    1/1917    Great Britain _____ 318—253

ORIS L. RADER, Primary Examiner

A. G. COLLINS, Assistant Examiner

U.S. Cl. X.R.

318—50, 140